United States Patent [19]

Fischer et al.

[11] Patent Number: 4,903,812
[45] Date of Patent: Feb. 27, 1990

[54] CLUTCH DISC

[75] Inventors: Matthias Fischer, Euerbach; Harald Jeppe, Schweinfurt, both of Fed. Rep. of Germany

[73] Assignee: Fichtel & Sachs AG, Schweinfurt, Fed. Rep. of Germany

[21] Appl. No.: 198,984

[22] Filed: May 26, 1988

[30] Foreign Application Priority Data

Jun. 5, 1987 [DE] Fed. Rep. of Germany ....... 3718848

[51] Int. Cl.$^4$ ............................................. F16D 3/66
[52] U.S. Cl. .................................... 192/106.2; 464/63
[58] Field of Search ......... 192/106.2, 103 B, 105 CD; 464/5, 63

[56] References Cited

U.S. PATENT DOCUMENTS

| | | | |
|---|---|---|---|
| 3,296,887 | 1/1967 | Larsen | 192/106.2 X |
| 3,329,245 | 7/1967 | Freber | 192/105 CD X |
| 3,367,463 | 2/1968 | Armstrong | 192/105 CD |
| 3,552,904 | 1/1971 | De Lancey | 192/105 CD |
| 4,231,237 | 11/1980 | Bochan | 192/105 CD X |
| 4,376,477 | 3/1983 | Loizeau | 192/106.2 |
| 4,396,103 | 8/1983 | Loizeau | 192/106.2 |
| 4,412,606 | 11/1983 | Loizeau | 192/105 CD X |
| 4,427,400 | 1/1984 | Lamarche | 192/106.2 X |
| 4,433,770 | 2/1984 | Loizeau et al. | 192/106.2 |
| 4,548,311 | 10/1985 | Lech | 192/106.2 |

FOREIGN PATENT DOCUMENTS 2950146 6/1981 Fed. Rep. of Germany.
2040398 8/1980 United Kingdom.

*Primary Examiner*—Rodney H. Bonck
*Attorney, Agent, or Firm*—Toren, McGeady & Associates

[57] ABSTRACT

The invention relates to a clutch disc including an idling damping device and an under-load damping device, wherein the idling damping device is active between two hub parts coupled with each other by a toothing having play in the circumferential direction. In order to avoid the load-change impact, centrifugal weights are provided between the two parts. The centrifugal weights frictionally couple the two parts by means of a self-intensifying effect.

13 Claims, 5 Drawing Sheets

CLUTCH DISC

BACKGROUND OF THE INVENTION

The invention relates to a clutch disc for a motor vehicle friction clutch.

A clutch disc with torsional vibration damping is known from DE-A-29 50 146 and the corresponding GB-A No. 2,040,398. The hub of the known clutch disc is provided with an internal toothing for a non-rotatable connection with a gear shaft and an external toothing for engagement in an internal toothing of a hub disc arranged concentrically with the hub. The toothings of the hub and the hub disc have a play in the circumferential direction which corresponds to the range of action of an idling damping device operationally arranged therebetween. Furthermore, an underload damping device is provided between the hub disc and the friction lining carrier.

In the known clutch disc, the idling damping device is bridged-over by centrifugal weights which, above the idling rotation rate, slide radially outwards and there engage in engagement openings. In this clutch disc, the non-rotatable connection between the hub and the hub disc takes place by engagement by virtue of shape. Good function is dependent upon great production expense, and the fitting of the individual parts is expensive.

In a clutch disc of the construction type as stated above, it is the function of the present invention to provide a bridge-over device which avoids the disadvantages of the prior art, is reliable in operation and is simple to fit.

SUMMARY OF THE INVENTION

The centrifugally controlled friction device provided in accordance with the invention between the hub and the first disc part, formed for example as hub disc, constitutes a force-engaging connection above the idling rotation rate, whereby the problems which can arise in the case of a shape-engaging connection are avoided. The friction device makes more simply producible components suffice which participate more uniformly in the force transmission and are easier to fit.

It is further proposed to mount centrifugal weights on the hub, which cooperate with a cylindrical inner wall of the first disc part (hub disc) with self-intensification. The pivotably mounted centrifugal weights render it possible to form the friction faces as cylindrical faces. Cylindrical faces are very simple to produce and defects of graduation cannot arise, in contrast to the known clutch disc. The self-intensification effect permits arranging the centrifugal weights on a small diameter and nevertheless achieving an adequate torque transmission.

Preferably, two centrifugal weights are provided. These can be self-intensifying both in the same direction of rotation, whereby the friction force is increased in one relative direction of rotation. However, it is also readily possible to make the two centrifugal weights self-intensifying in different relative directions of rotation.

Each centrifugal weight advantageously has preferably a semi-circular centrifugal weight body and carries at one end a flange protruding from the centrifugal weight body. The flange is guided by means of a guide bolt parallel to the axis of rotation in a corresponding slot of a radially protruding mounting bracket or an eye of a centrifugal weight carrier. The flange has a slot through which the guide bolt passes. Furthermore, a compression spring is provided which stresses the centrifugal weight radially inwards. In the inwardly driven condition of the centrifugal weight, the latter is supported on the guide bolt. For the torque transmission, each centrifugal weight is supported on the mounting bracket of the centrifugal weight carrier, so that the guide bolt is relieved of load. The pivoting movement of each centrifugal weight thus takes place essentially about a pivot axis which is formed by a radially inner edge at an end region of the centrifugal weight and a groove or flute provided at the foot of the mounting bracket. Thus a reduction of the pressure per unit area results in the torque transmission. The slot in the flange extends along a circle about the pivot axis.

In a preferred form of embodiment of the centrifugal weight arrangement, the centrifugal weights are hooked with a radially inwardly open groove on a flange of the centrifugal weight carrier, resulting in especially simple production and assembly. Furthermore, a leaf spring is provided which is adapted to the form of the internal contour of the centrifugal weight body, grasps around the latter at the end and thus is secured there in a simple manner. In the region of its other end, the leaf spring is fixed to the hub so that, in the outward movement of the centrifugal weight body, it exerts a return force upon the latter.

The various features of novelty which characterize the invention are pointed out with particularity in the claims annexed to, and forming a part of, this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 1:
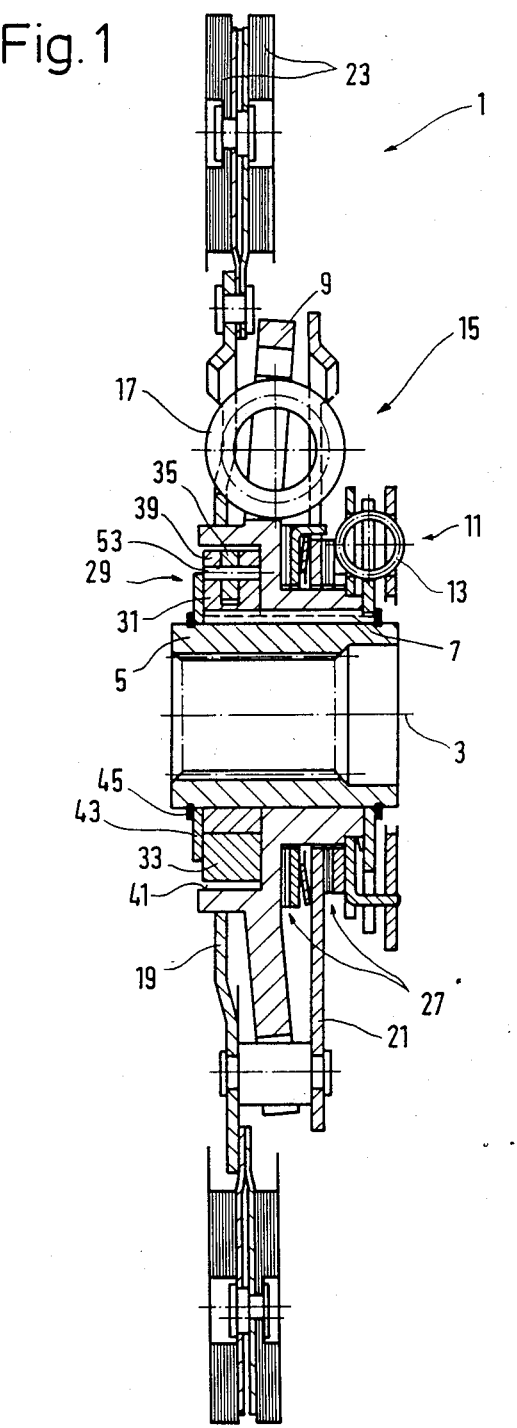
FIG. 1 shows an axial longitudinal section through a clutch disc of a motor vehicle friction clutch.

FIG. 1 shows a clutch disc 1 having a hub 5, rotatable about a rotation axis 3, for fitting non-rotatably on a gear shaft (not shown). The hub 5 has on its external circumference an external toothing 7 in which a first disc part or hub disc 9 engages with an internal toothing with play in the circumferential direction corresponding to the range of action of an idling damping device 11. The idling damping device 11 with its springs 13 is generally known in principle. It couples the hub 5 rotationally elastically with the hub disc 9 and may comprise a friction device. The clutch disc 1 further comprises a conventional under-load damping device 15 with springs 17 which couple the hub disc 9 rotationally elastically with a second disc part or friction lining carrier 19 and a cover disc 21 connected thereto. The friction lining carrier 19 carries two clutch friction rings 23 in the region of its external circumference. A friction device of the under-load damping device 15 is represented at 27.

On the side lying axially opposite to the idling damper device 11, a friction device 29 is arranged which—as will be explained in greater detail hereinafter—comprises a centrifugal weight carrier 31 which is fitted non-rotatably onto the external toothing 7 of the hub 5. The centrifugal weight carrier 31 carries centrifugal weight bodies 33 which are guided with a terminal flange 35 in a slot 37 of a mounting bracket or eye 39. The centrifugal weight bodies 33 place themselves in their outward movement against a cylindrical inner wall 41 of the hub disc 9. In the axial direction, the centrifugal weight carrier 31 is held by a washer 43 and by a circlip 45.

Figure 3:
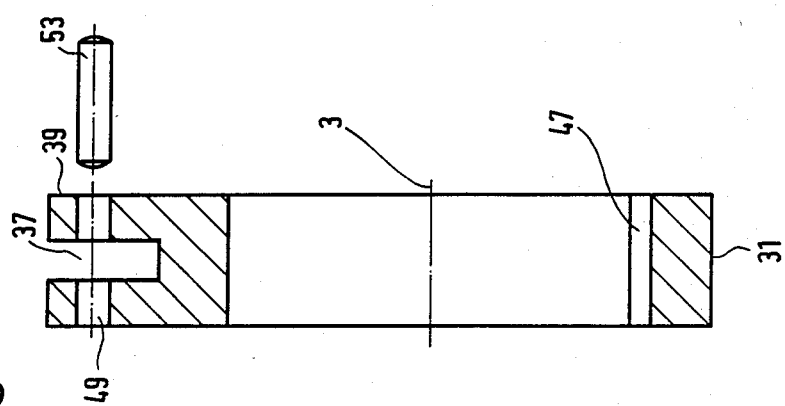
FIG. 3 shows a sectional view through the centrifugal weight carrier, seen along a line III—III in FIG. 2.
Figure 2:
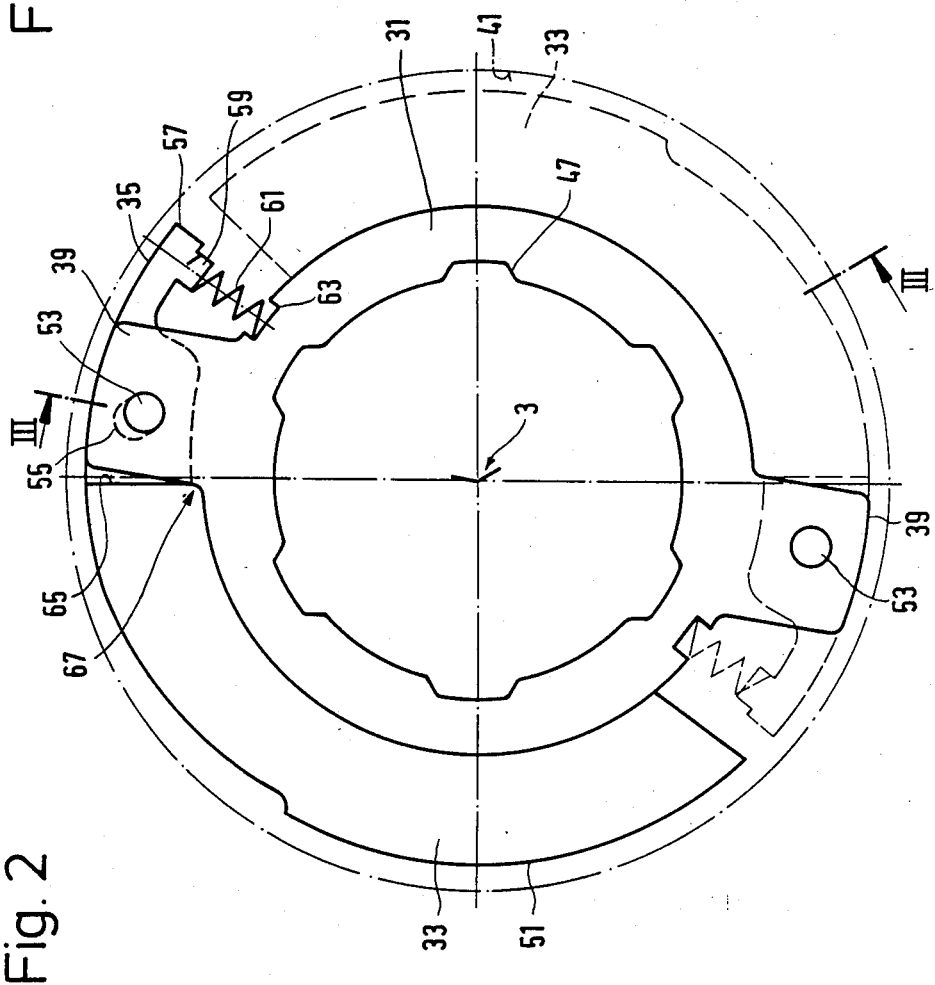
FIG. 2 shows a partial view of a centrifugal weight carrier with two centrifugal weight bodies.
Figure 5:
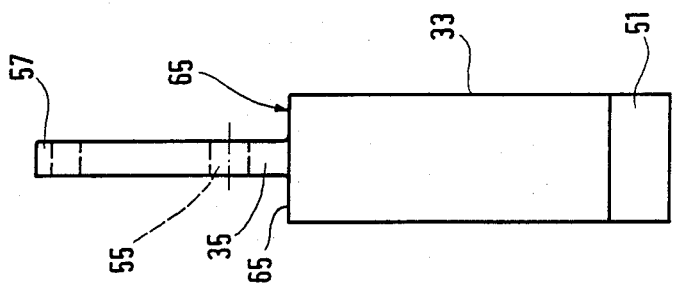
FIG. 5 shows a radial view of a centrifugal weight body, seen in the direction of an arrow V in FIG. 4.

FIGS. 2 and 3 show, in enlarged representation, a partial view of the centrifugal weight carrier 31 with two centrifugal weight bodies 33, and a section through the centrifugal weight carrier 31. The centrifugal weight carrier 31, which is arranged concentrically with the axis 3 of rotation, comprises an internal toothing 47 for non-rotatable fitting upon the external toothing 7 of the hub 5. On its external circumference, there are diametrically oppositely arranged two eyes 39 which each comprise a bore 49 and—see FIG. 3—the slot 37. The centrifugal weight bodies 33 are represented in FIG. 2 in their rest position. The radial view of one of the centrifugal weight bodies 33 may be seen from FIG. 5. The centrifugal weight body 33 has an arcuate form and forms a friction face 51 on a part of its external circumference in the region of one of its ends. At the end opposite to the friction face 51, the centrifugal weight body 33 merges into the flange 35 which is guided in the slot 37 of the centrifugal weight carrier 31. In this region, a guide bolt 53 is guided parallel with the rotation axis 3 through the eye 39 and the flange 35. For this purpose, a slot 55 is provided in the flange 35 of the centrifugal weight body 33, the function of which slot will be described in greater detail later. On an extension 57 of the flange 35, reaching out beyond the slot 37, there is arranged a radially inwardly pointing nose 59 which serves for the centering of a compression spring 61 which is supported on a depression 63 of the centrifugal weight carrier 31. The compression spring 61 serves for the return of the centrifugal weight body 33.

Figure 6:
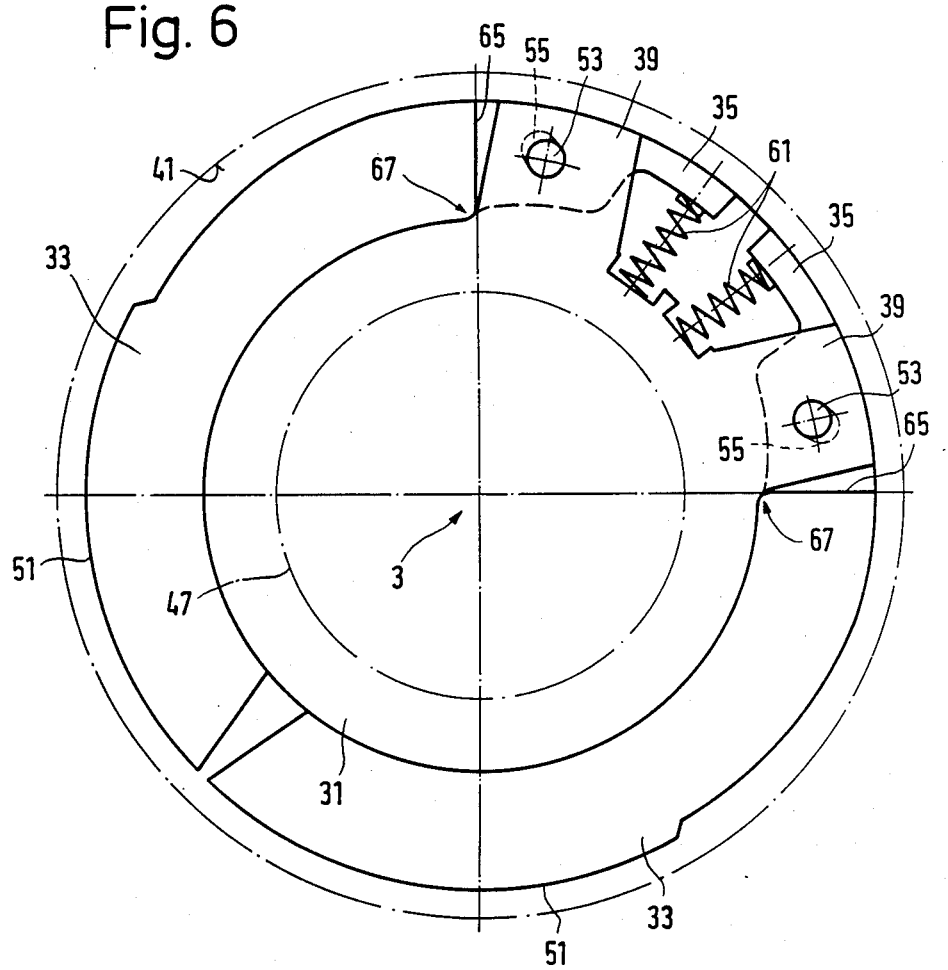
FIG. 6 shows a partial view of a centrifugal weight carrier with two centrifugal weight bodies in opposite arrangement.

The general function will next be explained in principle by reference to FIG. 1. At rotation rates of the clutch disc 1 in the region of the idling rotation rate, the centrifugal weight bodies 33 are retracted according to FIGS. 1 and 2. Thus occurring torsional vibrations can be damped by means of the idling damper device 11. The relative movement between the hub 5 and the hub disc 9 is in this case less than the play in the toothings of these two components. On a torque loading in operation under load, the toothings of the hub 5 and the hub disc 9 are in the abutting position and the torque is transmitted, torsional vibrations being damped by the under-load damper device 15. However, in the case of a sudden change of load, the rotational play in the toothings of hub 5 and hub disc 9 is suddenly run through, and what is called a load-change impact occurs. In addition further vibrations can be stimulated. In the present case, the load-change impact is prevented by the centrifugal weight bodies 33, which are driven out above the idling rotation rate. Due to the unilateral mounting of the centrifugal weight bodies 33 radially within, and at, a distance from the cylindrical surface 41, an effect of automatic intensification of the friction moment results, which renders possible a high friction moment even if the cylindrical face has a small diameter, so that the load-change impact is suppressed with certainty. In the case of internal combustion engines with especially high torque, it can here be necessary for both centrifugal weight bodies 33 to be effective in the same direction with self-intensification (FIG. 2), while in the case of smaller torques, the two centrifugal weight bodies 33 can be arranged to be self-intensifying in opposite directions of rotation (FIG. 6).

The function and the special arrangement of the centrifugal weight bodies 33 will now be explained in greater detail by reference to FIGS. 2 to 4. Since the guide bolt 53 would not suffice for the full torque transmission, in the present case it serves merely to secure the retracted centrifugal weight body 33, and prevents the centrifugal weight body 33 from being shifted too far outwards by the centrifugal force. The transmission of the torque from the centrifugal weight body 33 to the centrifugal weight carrier 31 takes place by way of shoulders 65 on both sides of the flange 35 to the eye 39 of the centrifugal weight carrier 31. During the pivoting-out movement of the centrifugal weight body 33, the latter moves about a pivot axis 67 which is formed by a radially inner edge of the shoulders 65 and a groove or flute in the foot region of the eye 39. In the driven-out condition, the centrifugal weight body 33 centers itself on the cylindrical inner wall 41, and the two shoulders 65 lie practically over their whole radial extent against the eye 39 of the centrifugal weight carrier 31. Thus, the pressure per unit area at this point is reduced to a permissible amount. During the outward movement about the pivot axis 67, the flange 35 moves radially inwards and compresses the compression spring 61, the slot 55 moving on a circular path in relation to the guide bolt 53. The different positions are here clearly visible from FIGS. 2 and 4, FIG. 4 showing the driven-out position of the centrifugal weight bodies 33.

Figure 4:
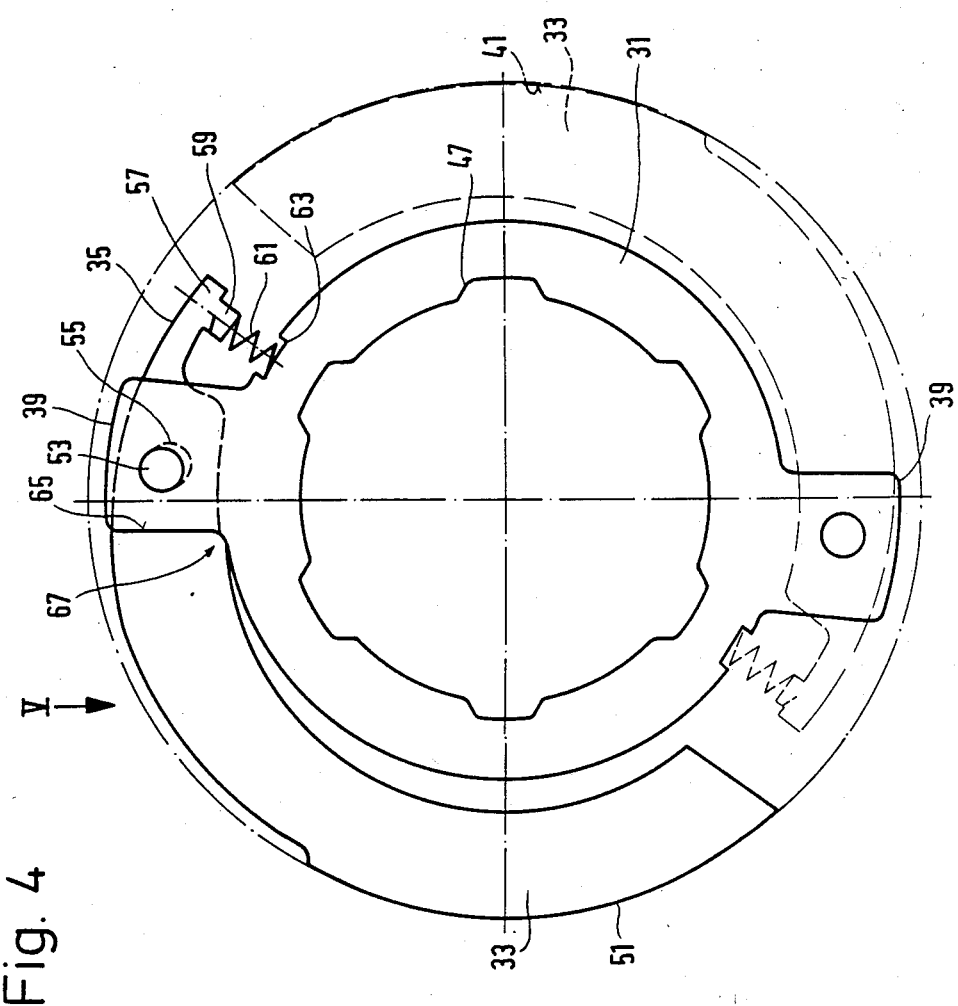
FIG. 4 shows a partial view corresponding to FIG. 2 with centrifugal weight bodies moved outwards.

The self-intensifying effect of the force transmission of the centrifugal weight bodies 33 according to FIGS. 2 and 4 is achieved in that the hub disc 9 is loaded with its cylindrical inner wall 14, in relation to the centrifugal weight bodies 33, towards their pivot bearings 67. The centrifugal weight bodies 33, through their friction faces 51, generate a torque acting upon the centrifugal weight body 33, about the pivot axis 67, intensifying the centrifugal force. On reversal of the direction of rotation, however, the self-intensifying effect is eliminated and a friction movement determined only by the centrifugal force takes place until the toothings of hub 5 and hub disc 9 come into abutment. Seen in the circumferential direction, the center of the friction face 51 has an angular distance of about 90° from the pivot axis 67, in order to achieve a maximum possible intensifying torque.

In FIGS. 2 and 4, the eyes 39 are provided symmetrically on the centrifugal weight carrier 31 and the two centrifugal weight bodies are arranged in the same direction in relation to the relative rotation. Thus, in this case, a maximum torque transmission from the hub disc 9 to the hub 5 is possible in only one direction of rotation. The arrangement is preferably made such that the self-intensifying effect of the centrifugal weights takes place in the case of thrust loading, that is in the case of torque transmission from the wheels to the internal combustion engine. It is, however, also possible to arrange the two centrifugal weight bodies 33 so that each effects a self-intensification for one predetermined direction of rotation. Then, both under thrust loading and under traction loading, a satisfactory arresting is achievable between the hub disc 9 and the hub 5. Such an embodiment is represented by way of example in FIG. 6. Here the two centrifugal weight bodies 33 are arranged in mirror image, their free ends for the one part and also their pivot bearings and springs for the other part being respectively adjacent to one another.

Figure 7:
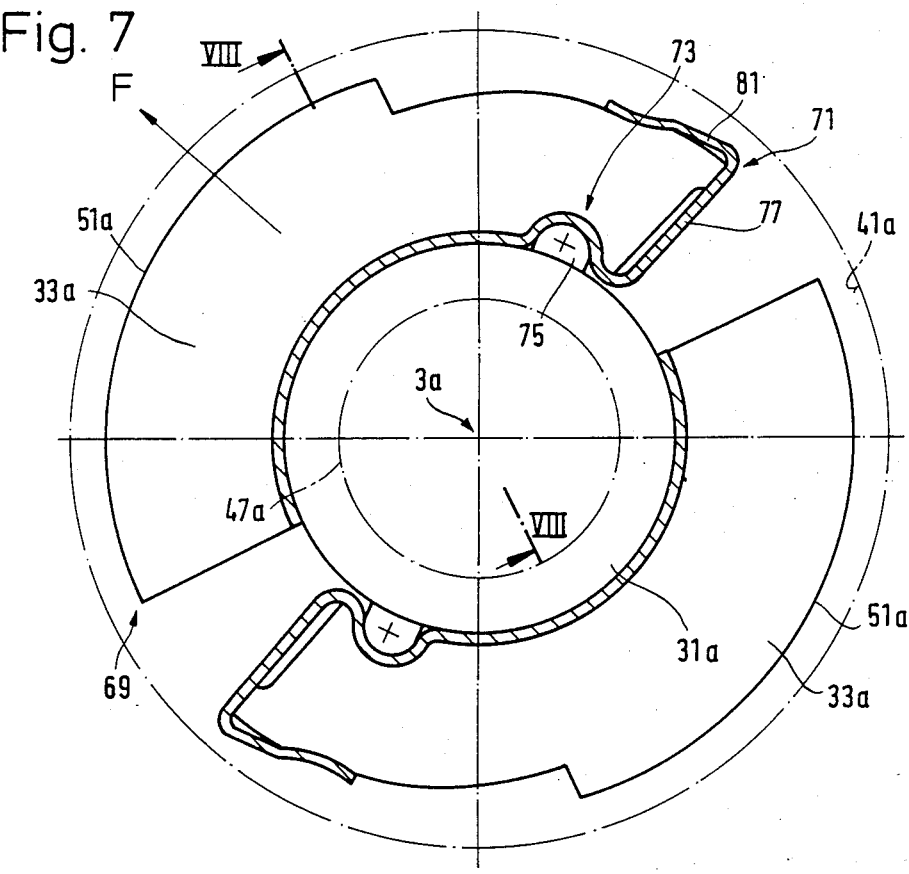
FIG. 7 shows a partial view of another centrifugal weight arrangement.
Figure 8:
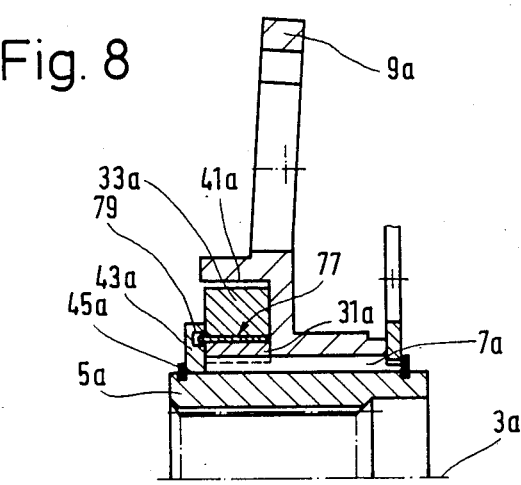
FIG. 8 shows a sectional view of the centrifugal weight arrangement, seen along a line VIII—VIII in FIG. 7.

A further possibility for the mounting of centrifugal weight bodies is represented in FIGS. 7 and 8, where components of the clutch disc, which are not essential to the function of the friction device, are omitted. Parts of like effect are designated by the reference numerals of FIGS. 1 to 6 and provided with the letter a for distinction. For explanation reference is made to the description of FIGS. 1 to 6.

The centrifugal weight bodies 33a, as represented here, each have approximately semi-circular form and are provided from their own end 69 with a friction face 51a which again extends only over a part of the circumferential length of the centrifugal weight bodies 33a. In the region of the other end of each centrifugal weight body 33a, the latter is provided with a radially inwardly open groove 73. A rib 75 of the centrifugal weight carrier 31a extends into the groove 73. The groove 73 and the rib have semi-circular cross-sections and extend parallel to the rotation axis 3a, and the two together form a pivot bearing for the centrifugal weight bodies 33a. The centrifugal weight bodies 33a are held in their radially inner position by leaf springs 77. The leaf spring 77 is adapted substantially to the inner contour of the centrifugal weight body 33a in the retracted condition. It is for the one part made wider, at least in the region of the centrifugal weight carrier 31a, than the centrifugal weight body 33a, and reaches, seen in the axial direction, into an annular groove 79 of the washer 43a, which together with the circlip 45a takes over the axial fixing of the whole vibration damper (FIG. 8).

Furthermore, the leaf spring 77 extends in the groove 73 and grasps around the end 71 of the centrifugal weight body 33a, resting with its free end 81 on the outer side of the end 71. Due to grasping around the centrifugal weight body 33a for the one part and the fixing in the groove 79 of the washer 43a for the other part, the leaf spring 77 is in a position to hold the centrifugal weight body 33a on the centrifugal weight carrier 31a against the centrifugal force F, in the region of the idling rotation rate, and to render possible a pivoting movement radially outwards about the rib 75 at rotation rates above the idling rotation rate. In the outwardly driven condition, the two centrifugal weight bodies 33a center themselves on the cylindrical inner wall 41, the partially cylindrical contour of the friction face 51a ensuring that the groove 73 and the rib 75 remain in engagement and transmit the torque.

The embodiment as described here is distinguished by few individual parts which are simple to produce, while assembly likewise takes place very simply by axial pushing on of the parts. Here again, it is possible according to FIG. 6 to arrange the two centrifugal weight bodies in mirror image, so that in each direction of rotation one centrifugal weight works with self-intensifying effect.

While specific embodiments of the invention have been shown and described in detail to illustrate the application of the inventive principles, it will be understood that the invention may be embodied otherwise without departing from such principles.

What we claim is:

1. A clutch disc for a motor vehicle friction clutch, comprising
   (a) a hub rotatable about a rotation axis,
   (b) a first disc part rotatable about the rotation axis within a limited rotational play in relation to the hub,
   (c) at least one first spring coupling the first disc part rotationally elastically with the hub and dimensioned for idling operation,
   (d) a second disc part rotatable in relation to the hub and the first disc part,
   (e) at least one second spring, dimensioned for operation under load, which rotationally elastically couples the second disc part with the first disc part,
   (f) clutch friction linings connected with the second disc part,
   (g) a friction device acting between the hub and the first disc part and controllable by at least one centrifugal weight body stressed by a spring contrarily of its centrifugal direction, the friction torque of which device commences above the idling rotation rate and increases with increasing rotation rate, the first disc part has a cylindrical inner wall coaxial with the axis of rotation and wherein the centrifugal weight body is mounted on the hub pivotably about a pivot axis parallel to the rotation axis and for the achievement of a self-intensifying effect comprises a part-cylindrical friction face arranged, seen in the circumferential direction of the cylindrical inner wall, exclusively on one side of the pivot axis, which friction face rests on the inner wall when the centrifugal weight body is pivoted radially outwards, the centrifugal weight body is curved in arcuate form around a centrifugal weight carrier which annularly surrounds the hub and is non-rotatably held thereon, from which carrier a mounting bracket provided with a slot protrudes radially, for the mounting of the centrifugal weight body, and wherein the centrifugal weight body carries, at its end adjacent in the circumferential direction to the mounting bracket, a flange pivotably guided in the slot, which flange is supported, on the side of the mounting bracket remote from the friction face, through a compression spring on the centrifugal weight carrier.

2. A clutch disc according to claim 1, wherein the mounting bracket forms in the region of its foot a flute in which a tilt edge if the centrifugal weight body engages to form the pivot axis and wherein the mounting bracket forms a support face radially outwardly adjoining the groove, on which the centrifugal weight body rests flat with a shoulder in a radially outwardly pivoted position.

3. A clutch disc according to claim 1, wherein the flange contains a slot extending approximately along a circle about the pivot axis, through which slot there passes a guide bolt extending parallel to the axis of rotation and held in the mounting bracket.

4. A clutch disc for a motor vehicle friction clutch, comprising (a) a hub rotatable about a rotation axis,
(b) a first disc part rotatable about the rotation axis within a limited rotational play in relation to the hub,
(c) at least one first spring coupling the first disc part rotationally elastically with the hub and dimensioned for idling operation,
(d) a second disc part rotatable in relation to the hub and the first disc part,
(e) at least one second spring, dimensioned for operation under load, which rotationally elastically couples the second disc part with the first disc part,
(f) clutch friction linings connected with the second disc part,
(g) a friction device acting between the hub and the first disc part and controllable by at least one centrifugal weight body stressed by a spring contrarily of its centrifugal direction, the friction torque of which device commences above the idling rotation rate and increases with increasing rotation rate, the first disc part has a cylindrical inner wall coaxial with the axis of rotation and wherein the centrifugal weight body is mounted on the hub pivotably about a pivot axis parallel to the rotation axis and for the achievement of a self-intensifying effect comprises a part-cylindrical friction face arranged, seen in the circumferential direction of the cylindrical inner wall, exclusively on one side of the pivot axis, which friction face rests on the inner wall when the centrifugal weight body is pivoted radially outwards, the centrifugal weight body is curved in arcuate form about a centrifugal weight carrier annularly enclosing the hub and held non-rotatably thereon and wherein the centrifugal weight body is guided pivotably with one end on the centrifugal weight carrier by means of a tilt bearing, defining the pivot axis, which consists of a radially open groove extending parallel with the axis of rotation, and of a rib engaging tiltably in the groove.

5. A clutch disc according to claim 4, wherein the rib and the groove each have an approximately semi-circular cross-section and the rib protrudes radially outwardly from the centrifugal weight carrier.

6. A clutch disc according to claim 4, wherein the centrifugal weight body is radially inwardly initially stressed by a leaf spring which is supported with its first end on the centrifugal weight body and is connected by its second end through a connection element with the hub.

7. A clutch disc according to claim 6, wherein the leaf spring extends along the inner contour of the centrifugal weight body radially between the latter and the centrifugal weight carrier, away over the rib of the tilt bearing, grasps with its first end around the end of the centrifugal weight body adjacent to the tilt bearing on the outside thereof and is supported on the outside.

8. A clutch disc according to claim 7, wherein the second end of the leaf spring protrudes axially, on the side axially remote from the first disc part, beyond the centrifugal weight body and the centrifugal weight carrier, and engages in an annular groove of a washer axially fixed on the hub.

9. A clutch disc according to claim 1 or 4, wherein the pivot axis of the centrifugal weight body extends radially within and with spacing from the cylindrical inner wall of the first disc part.

10. A clutch disc according to claim 1 or 3, wherein an end of the friction face of the centrifugal weight body placed remotely in the circumferential direction from the pivot axis, is spaced by an angle of more than 90° around the axis of rotation from the pivot axis of the centrifugal weight body.

11. A clutch disc according to claim 10, wherein—seen in the circumferential direction—the center of the friction face is spaced by an angle of about 90° from the pivot axis about the axis of rotation.

12. A clutch disc according to claim 1 or 4, wherein two centrifugal weight bodies are provided, the friction faces of which are arranged in the same circumferential direction in relation to the pivot axis.

13. A clutch disc according to claim 1 or 4, wherein two centrifugal weight bodies are provided, the friction faces of which are arranged in opposite circumferential directions in relation to the pivot axis.

* * * * *